United States Patent [19]

Potts et al.

[11] Patent Number: 5,717,891

[45] Date of Patent: Feb. 10, 1998

[54] DIGITAL SIGNAL PROCESSOR WITH CACHING OF INSTRUCTIONS THAT PRODUCE A MEMORY CONFLICT

[75] Inventors: James F. Potts, West Newton; Kevin W. Leary, East Walpole, both of Mass.

[73] Assignee: Analog Devices, Inc., Norwood, Mass.

[21] Appl. No.: 542,449

[22] Filed: Oct. 12, 1995

[51] Int. Cl.[6] .................................................. G06F 13/00
[52] U.S. Cl. ......................................................... 395/452
[58] Field of Search ................................... 395/308, 375, 395/452, 453, 497.04

[56] References Cited

U.S. PATENT DOCUMENTS

| | | | |
|---|---|---|---|
| 4,739,470 | 4/1988 | Wada et al. | 395/393 |
| 5,034,887 | 7/1991 | Yasui et al. | 395/497.04 |
| 5,276,822 | 1/1994 | Maekawa et al. | 395/375 |
| 5,301,295 | 4/1994 | Leary et al. | 395/425 |
| 5,369,762 | 11/1994 | Wolf | 395/600 |
| 5,481,679 | 1/1996 | Higaki et al. | 395/308 |

FOREIGN PATENT DOCUMENTS

WO91/14225  9/1991  WIPO.

*Primary Examiner*—David L. Robertson
*Attorney, Agent, or Firm*—Wolf, Greenfield & Sacks, P.C.

[57] ABSTRACT

A digital signal processor includes a control circuit for controlling transfer of instructions to and between a computation unit, a memory and an instruction cache. The memory includes a plurality of memory blocks. The control circuit includes a circuit for detecting a memory conflict condition when an instruction address on a first bus and a data address on a second bus both reference locations in one of the memory blocks in a single clock cycle. In response to the memory conflict condition, the instruction corresponding to the instruction address is fetched from the instruction cache when the instruction is stored in the instruction cache. When the instruction is not stored in the instruction cache, the instruction is fetched from memory and is loaded into the instruction cache. An internal memory conflict occurs when the instruction address and the data address reference locations in the same block of internal memory in the same clock cycle. An external memory conflict occurs when the instruction address and the data address reference locations in external memory in the same clock cycle. By selectively caching only those instructions which produce a conflict, a small instruction cache can be used.

17 Claims, 4 Drawing Sheets

DIGITAL SIGNAL PROCESSOR WITH CACHING OF INSTRUCTIONS THAT PRODUCE A MEMORY CONFLICT

FIELD OF THE INVENTION

This invention relates to digital signal processors and, more particularly, to methods and apparatus for selective caching of instructions that produce a memory conflict in digital signal processors.

BACKGROUND OF THE INVENTION

A digital signal computer, or digital signal processor (DSP), is a special purpose computer that is designed to optimize performance for digital signal processing applications, such as, for example, fast Fourier transforms, digital filters, image processing and speech recognition. Digital signal processor applications are characterized by real time operation, high interrupt rates and intensive numeric computations. In addition, digital signal processor applications tend to be intensive in memory access operations and to require the input and output of large quantities of data. Thus, designs of digital signal processors may be quite different from those of general purpose processors.

One approach that has been used in the architecture of digital signal processors is the Harvard architecture, which utilizes separate, independent program and data memories so that the two memories may be accessed simultaneously. This architecture permits instructions and data to be accessed in a single clock cycle. Frequently, the program occupies less memory space than data. To achieve full memory utilization, a modified Harvard architecture utilizes the program memory for storing both instructions and data. Typically, the program and data memories are interconnected to the core processor by separate program and data buses.

When instructions and data are stored in the program memory, conflicts may arise in the fetching of instructions. For example, certain instruction types, known as PMDA (program memory data access) instructions, may require data fetches from the program memory. In the pipelined architecture which may be used in a digital signal processor, the data fetch required by a PMDA instruction may conflict with a subsequent instruction fetch. The conflict occurs because both the data fetch and the instruction fetch attempt to use the program bus to access the program memory on the same clock cycle. A technique for overcoming this problem by selective caching of PMDA instructions, based on detection of PMDA instructions, is disclosed in U.S. Pat. No. 5,301,295 issued Apr. 5, 1994 to Leary et al. The PMDA instruction is fetched from the instruction cache on subsequent occurrences of the PMDA instruction during program execution, and conflicts for use of the program memory bus are eliminated.

Other types of conflicts may occur in a digital signal processor utilizing the modified Harvard architecture. AS noted above, separate program and data buses are connected to the program and data memories to permit parallel access in a single clock cycle. However, because instructions and data may both be stored in the program memory in the modified Harvard architecture, the data bus is connected to the program memory as well as to the data memory. Normally, the program sequencer issues instruction addresses on the program memory bus, and the data address generator issues data addresses on the data bus. Except in the case of PMDA instructions, a bus conflict of the type described in U.S. Pat. No. 5,301,295 does not occur. However, even though the instruction address and the data address are issued on separate buses, they may both reference locations in the same block of program memory in the same clock cycle. Since simultaneous accesses to the same memory block are not permitted, a memory conflict occurs. In prior art systems, the instruction fetch is delayed to a subsequent cycle by the memory conflict, and performance is degraded.

Another conflict occurs when the instruction address on the program memory bus and the data address on the data bus both reference memory that is external to the digital signal processor chip in the same clock cycle. Since the digital signal processor chip typically has a single external bus that may be connected to the program bus or the data bus, a conflict for access to external memory occurs.

It is desirable to eliminate delay caused by such memory conflict conditions to the extent possible and to thereby enhance the performance of the digital signal processor.

SUMMARY OF THE INVENTION

According to the present invention, a digital signal processor comprises a computation unit for performing digital signal computations, a memory including a plurality of memory blocks for storing instructions and data for the digital signal computations, a first bus and a second bus interconnecting the computation unit and the memory, an instruction cache for storing selected instructions, and a control circuit for controlling transfer of instructions to and between the memory, the instruction cache and the computation unit. The control circuit includes means for detecting a memory conflict condition when an instruction address on the first bus and a data address on the second bus both reference locations in the same memory block in a single clock cycle, and means responsive to the memory conflict condition for fetching an instruction corresponding to the instruction address from the instruction cache when the instruction is stored in the instruction cache and for fetching the instruction from the memory and loading the instruction into the instruction cache when the instruction is not stored in the instruction cache.

The memory conflict may be an internal memory conflict or an external memory conflict. In an internal memory conflict, the instruction address on the first bus and the data address on the second bus both reference locations in the same block of internal memory in the same clock cycle. In an external memory conflict, the instruction address on the first bus and the data address on the second bus both reference locations in an external memory. Since the digital signal processor has a single external bus, a conflict occurs. In each case, the instruction causing the conflict is stored in the instruction cache. On subsequent instances of the instruction during program execution, the instruction is fetched from the instruction cache, and any delay caused by the memory conflict is eliminated. By selectively caching only those instructions which produce a conflict, a small instruction cache can be used.

BRIEF DESCRIPTION OF THE DRAWINGS

For a better understanding of the present invention, reference is made to the accompanying drawings which are incorporated herein by reference and in which.

DETAILED DESCRIPTION

Figure 1:
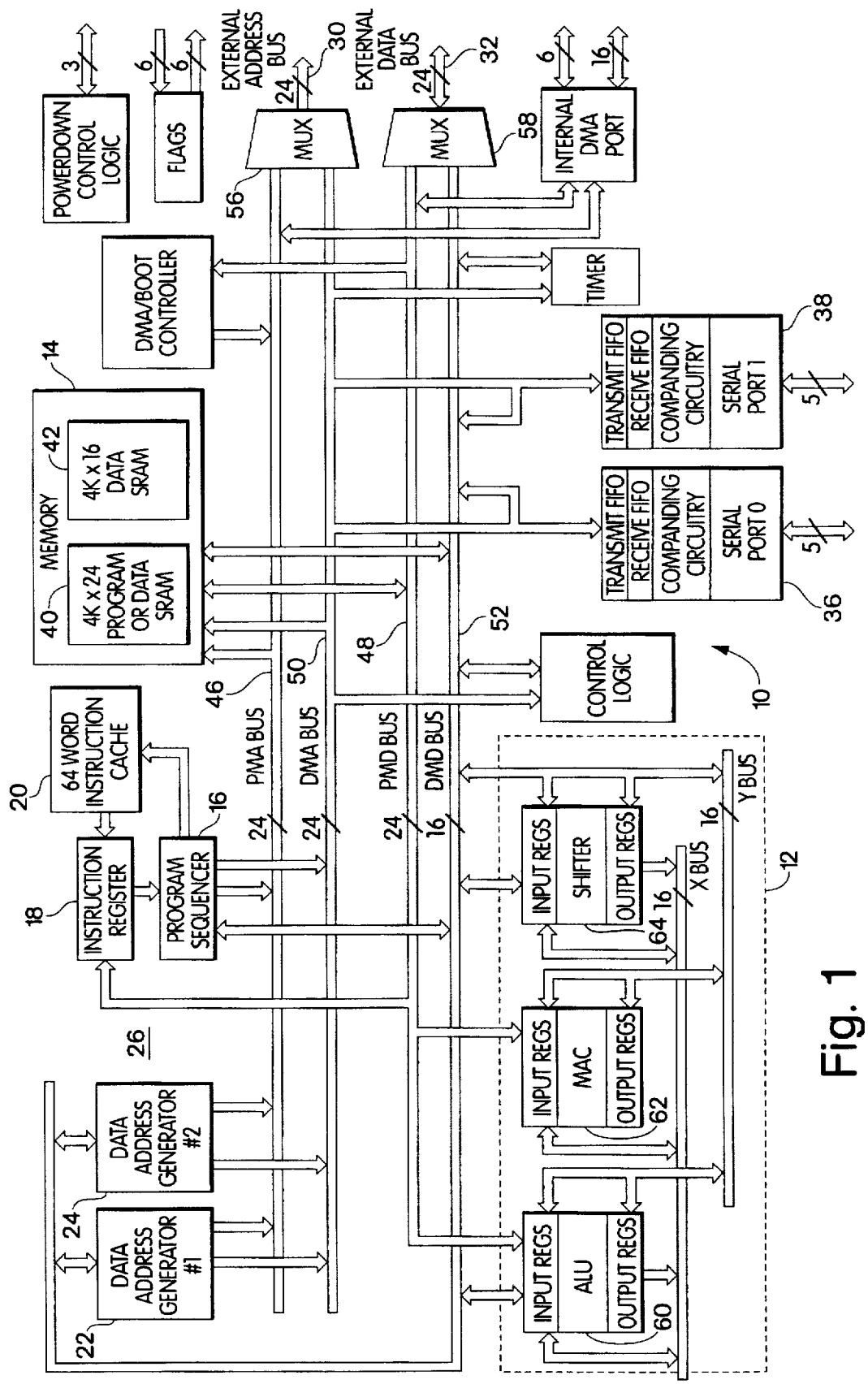
FIG. 1 is a block diagram of an example of a digital signal processor in accordance with the present invention.

A block diagram of an example of a digital signal processor (DSP) 10 in accordance with the present invention is shown in FIG. 1. A computation unit 12 performs the main computation and data processing functions of the DSP 10. Instructions and data for the operations of the computation unit 12 are stored in a memory 14. The flow of instructions and data to the computation unit 12 is controlled by a program sequencer 16, an instruction register 18, an instruction cache 20 and data address generator 22 and 24. The computation unit 12, the memory 14, the program sequencer 16, the instruction register 18, the instruction cache 20 and data address generators 22 and 24 constitute a core processor 26 of the DSP 10.

The DSP 10 may communicate with a host or external memory on an external address bus 30 and an external data bus 32. The DSP 10 may communicate serially with external devices through serial ports 36 and 38.

The DSP 10 is typically configured as a single monolithic integrated circuit. The memory 14 includes two memory banks 40 and 42 in a modified Harvard architecture configuration. In a preferred embodiment, memory bank 40 has a capacity of 4K words by 24 bits for storage of instructions and data and is referred to as program memory (PM). The memory bank 42 has a capacity of 4K words by 16 bits for data storage and is referred to as data memory (DM). In the example of FIG. 1, memory banks 40 and 42 have a single address space and can be viewed as a single memory for addressing purposes. However, since 24 bit instructions are used, they must be stored in the 24 bit portion (memory bank 40) of memory 14. Each memory bank may include one or more memory blocks. In the above example, memory bank 40 includes two blocks and memory bank 42 includes two blocks. Each of the four blocks is 2K words in length.

A program memory bus includes a program memory address (PMA) bus 46 (address) and a program memory data (PMD) bus 48 (data). A data memory bus includes a data memory address (DMA) bus 50 (address) and a data memory data (DMD) bus 52 (data). In the preferred embodiment, the PMA bus 46, the PMD bus 48 and the DMA bus 50 are each 24 bits wide, and the DMD bus 52 is 16 bits wide. The PMD bus 48 and the DMD bus 52 interconnect the computation unit 12 and the memory banks 40 and 42. The PMA bus 46 and the DMA bus 50 interconnect the program sequencer 16, memory banks 40 and 42 and data address generators 22 and 24. The PMD bus 48 supplies instructions to the instruction register 18. The PMA bus 46 and the DMA bus 50 are connected through a multiplexer 56 to external address bus 30. The PMD bus 48 and the DMD bus 52 are connected through a multiplexer 58 to external data bus 32. The multiplexer 56 selects one of the address buses 46 and 50 for connection to the external address bus 30. The multiplexer 58 selects one of the data buses 48 and 52 for connection to the external data bus 32.

The computation unit 12 includes an arithmetic logic unit (ALU) 60, a multiplier accumulator 62 and a shifter 64, each of which have input registers and output registers. The elements of the computation unit 12 perform 16 bit, fixed point digital signal computations in the preferred embodiment.

In the modified Harvard architecture of the DSP 10, the DMD bus 52 transfers data and the PMD bus 48 transfers both instructions and data. Data address generator 22 and data address generator 24 each supply data addresses on PMA bus 46 and DMA bus 50. The program sequencer 16 may use a three-stage pipeline having fetch, decode and execute stages. Using only the PMD bus 48 and the DMD bus 52, an instruction and an operand can be fetched in a single clock cycle. When an instruction is stored in instruction cache 20, two operands can be fetched from memory banks 40 and 42, and an instruction can be fetched from cache 20, in a single clock cycle. As described below, instructions are selectively stored in instruction cache 20 when various conflict conditions are detected.

Figure 2:
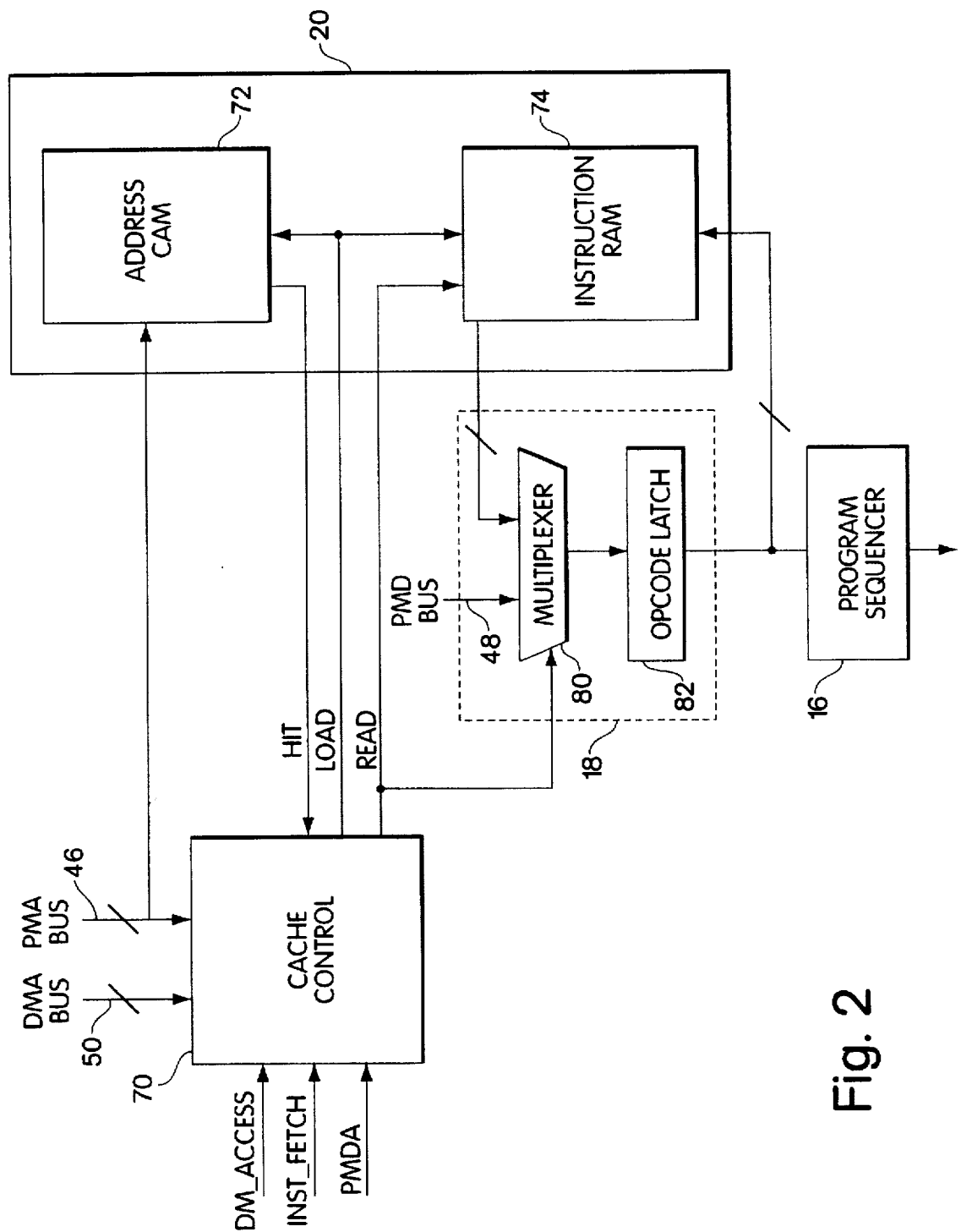
FIG. 2 is a block diagram showing instruction cache logic for instruction control in accordance with the present invention.

A block diagram of the instruction cache logic is shown in FIG. 2. Cache control logic 70 controls reading and loading of instruction cache 20, detection of conflicts and loading of instructions into instruction register 18. The cache control logic 70 receives a DM ACCESS signal, which indicates that a data memory access is requested, an INST FETCH signal, which indicates that an instruction fetch is requested, and a PMDA signal, which indicates that program memory data access is requested. The cache control logic is connected to the DMA bus 50 and the PMA bus 46.

The instruction cache 20 includes a content addressable memory (CAM) 72, which contains the address of each instruction that is stored in cache 20, and an instruction random access memory (RAM) 74 which contains the instruction stored at the instruction address. The PMA bus 46 is connected to the address CAM 72. When an instruction address on PMA bus 46 matches an address in address CAM 72, a HIT signal is provided to cache control logic 70, indicating that the instruction to be fetched is stored in the instruction cache 20. In this case, a READ signal from the cache control logic 70 causes the corresponding instruction to be read from instruction RAM 74. The output of the instruction RAM 74 is supplied through a multiplexer 80 to an opcode latch 82. The multiplexer 80 is controlled by the READ signal. Thus, when the instruction to be fetched is stored in instruction cache 20, that instruction is loaded from instruction RAM 74 into opcode latch 82. The instruction is then supplied from the opcode latch 82 to the program sequencer 16. Selective loading of instructions into instruction cache 20 by the cache control logic 70 is described below.

Figure 3:
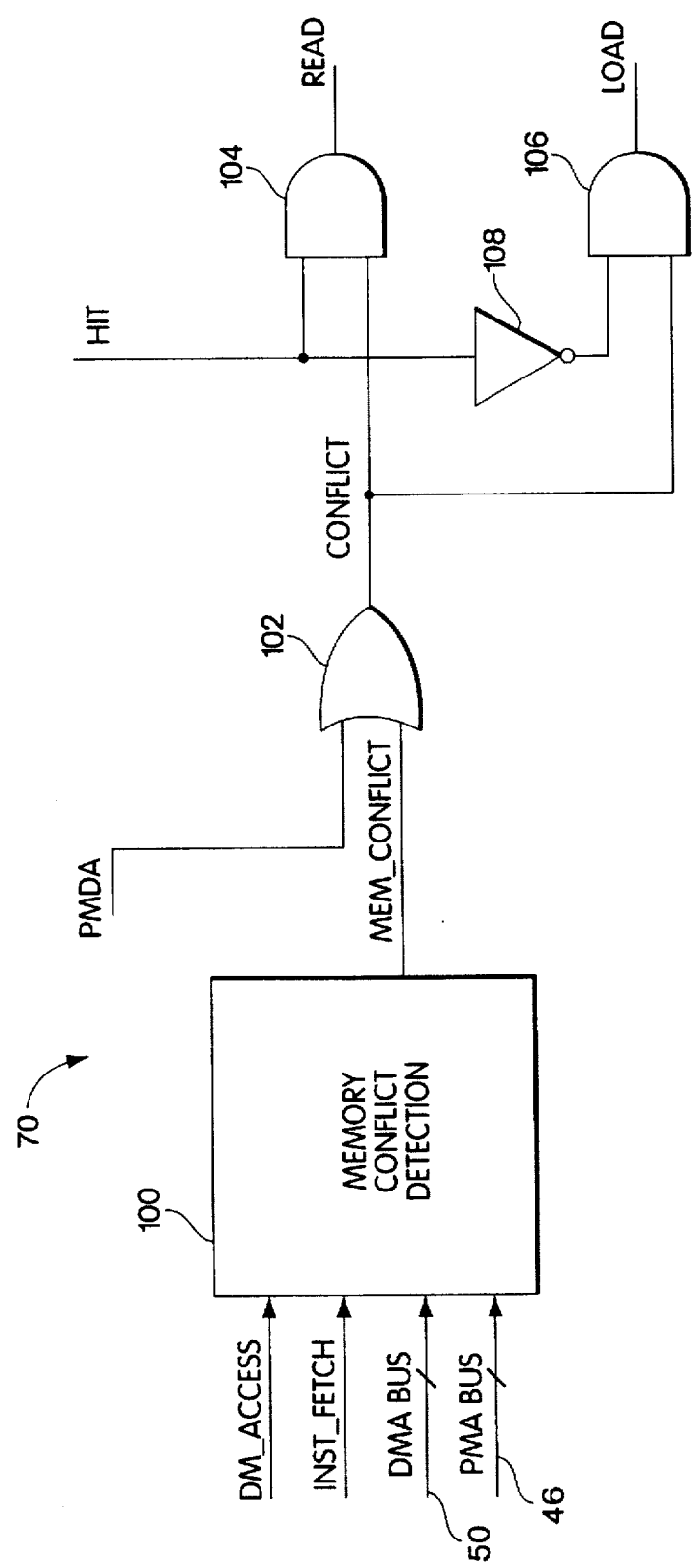
FIG. 3 is a block diagram of the cache control logic shown in FIG. 2.

A block diagram of the cache control logic 70 is shown in FIG. 3. Memory conflict detection logic 100 detects a memory conflict condition and supplies a MEM CONFLICT signal to one input of an OR gate 102. The PMDA signal, indicative of a PMDA conflict, is supplied to another input of OR gate 102. The PMDA signal may be generated by circuitry as described in the aforementioned U.S. Pat. No. 5,301,295, which is hereby incorporated herein by reference. The output of OR gate 102 is a CONFLICT signal which indicates that one of the conflict conditions has occurred. The CONFLICT signal is supplied to one input of an AND gate 104 and one input of an AND gate 106. The HIT signal from address CAM 72 (FIG. 2) is supplied to another input of AND gate 104 and is supplied through an inverter 108 to another input of AND gate 106. The output of AND gate 104 is the READ signal which, as described above, enables reading of instruction RAM 74 and which controls multiplexer 80. The output of AND gate 106 is a LOAD signal which controls the loading of instruction addresses into address CAM 72 and loading of instructions into instruction RAM 74 of instruction cache 20.

The cache control logic shown in FIG. 3 operates as follows. When a conflict condition occurs, as indicated by the CONFLICT signal at the output of OR gate 102, and the HIT signal is active, indicating that the instruction corresponding to the current instruction address on the PMA bus 46 is stored in the instruction cache 20, a READ signal is provided to the instruction cache 20. Instruction RAM 74 provides the required instruction to multiplexer 80. The READ signal supplied to multiplexer 80 causes the output of the instruction RAM 74 to be loaded into opcode latch 82.

When a conflict condition occurs and the HIT signal is not active, indicating that the required instruction is not stored in the instruction cache 20, the LOAD signal is provided to the address CAM 72, causing the address on the PMA bus 46 to be loaded into the address CAM 72 using a least recently used algorithm. When the LOAD signal is active, the READ signal is inactive, causing the multiplexer 80 to select the input from the PMD bus 48. The instruction on the PMD bus 48 is loaded into the opcode latch 82 and is also loaded into the instruction RAM 74 of instruction cache 20. On a subsequent fetch of that instruction in the program, the instruction is available in the instruction cache, and the conflict is effectively eliminated. It is important to note that only those instructions which cause a conflict are loaded into the instruction cache 20. This selective caching technique permits a relatively small instruction cache to be utilized. In a preferred embodiment, the instruction cache 20 has a capacity of 64 instructions.

Figure 4:
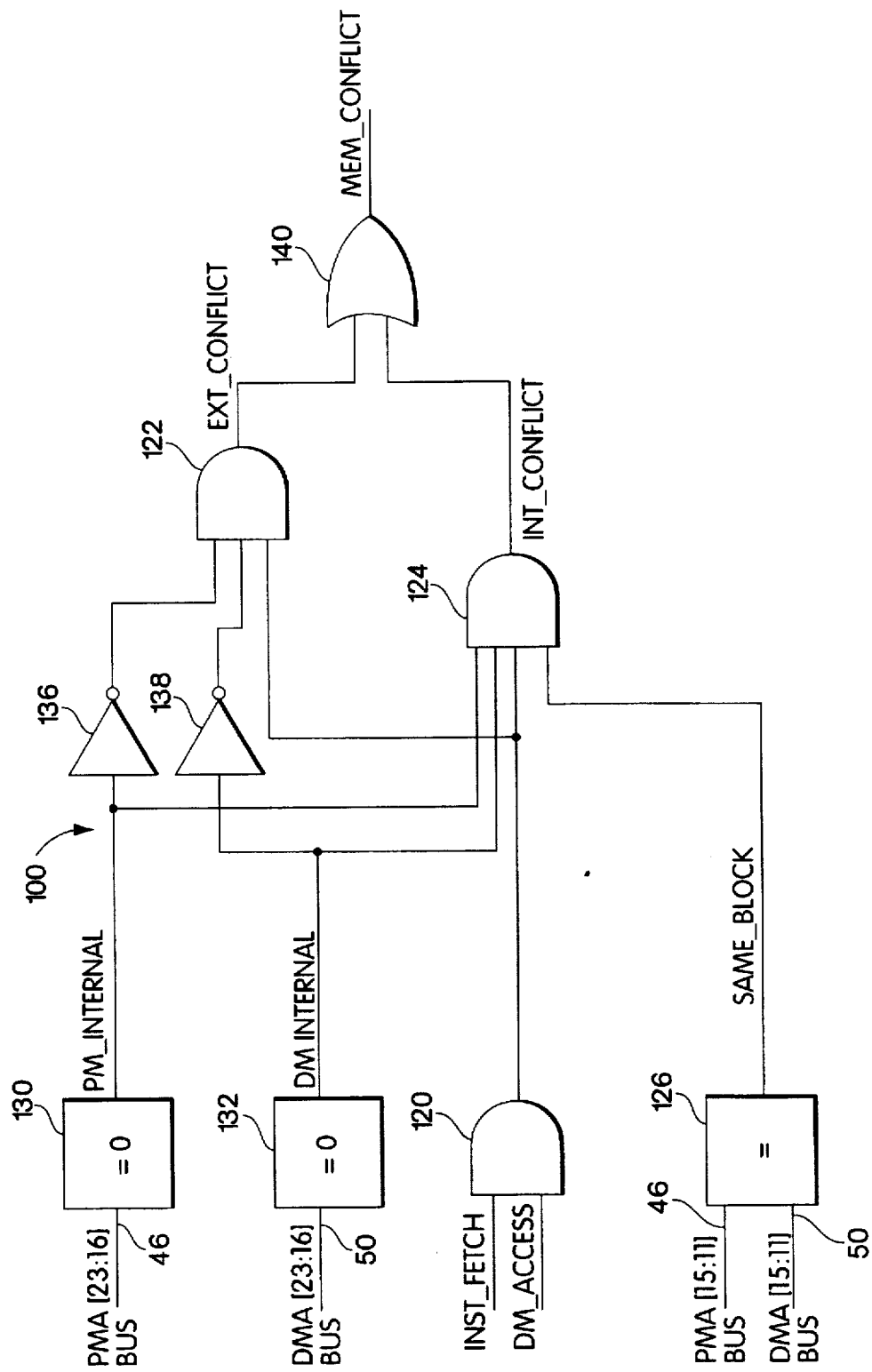
FIG. 4 is a block diagram of the memory conflict detection logic shown in FIG. 3.

A block diagram of the memory conflict detection logic 100 is shown in FIG. 4. The detection logic 100 detects two types of memory conflict. An internal memory conflict occurs when an instruction fetch and a data fetch both attempt to address the same memory block in a single clock cycle. As used in this context, "memory block" refers to a memory or a section of memory having single addressing capability. Thus, two locations may not be addressed in the same memory block simultaneously. A second conflict type is an external memory conflict. In this case, an instruction fetch and a data fetch both attempt to access external memory in a single clock cycle. Since the DSP 10 has only one external bus, as shown in FIG. 1, the instruction fetch and the data fetch conflict for use of the external bus.

As shown in FIG. 4, an AND gate 120 receives the INST FETCH signal and the DM ACCESS signal. The output of gate 120, which indicates that an instruction fetch and a data fetch are occurring on the same clock cycle, is supplied to an AND gate 122 and an AND gate 124. A comparator 126 receives five of the address bits on the PMA bus 46, PMA [15:11], and five of the address bits on the DMA bus 50, DMA [15:11]. The address bits supplied to comparator 126 are the bits which represent the memory block being accessed. In the present example, bits 11 through 15 of the address indicate the memory block. When the comparator 126 determines that these bits are equal, a SAME BLOCK signal is provided to AND gate 124. Two additional inputs to AND gate 124 indicate that the instruction fetch and the data access are accessing locations the internal memory of the DSP 10. The output of AND gate 124 is an INT CONFLICT signal indicative of an internal memory conflict as described above.

A logic gate 130 receives eight of the address bits on the PMA bus 46, PMA [23:16], which are indicative of a section of the memory space being accessed for the instruction fetch. When all of the bits of the instruction address being examined are zeros, the gate 130 supplies a PM INTERNAL signal, indicating that the instruction fetch is accessing internal memory of the DSP 10. Similarly, a gate 132 receives eight of the address bits on DMA bus 50, DMA [23:16], which indicate a section of memory being accessed for the data fetch. When all of the bits of the data address being examined are zeros, the gate 132 provides a DM INTERNAL signal, indicating that the data fetch is accessing internal memory of the DSP 10. In the present example, bits 16 through 23 are used for this purpose. When all of the bits of the instruction address or the data address are zeros, an internal memory access is indicated. When any of the bits is a one, an external memory access is indicated. The PM INTERNAL signal and the DM INTERNAL signal are supplied to AND gate 124. These signals are also provided through inverters 136 and 138, respectively, to AND gate 122. The output of AND gate 122 is an EXT CONFLICT signal, indicating that the instruction fetch and the data fetch are both addressing external memory. The INT CONFLICT signal and the EXT CONFLICT signal are supplied to an OR gate 140. The output of OR gate 140 is the MEM CONFLICT signal supplied as the output of memory conflict detection logic 100.

In accordance with the invention, various conflict conditions which may occur during the operation of the DSP 10 are detected. In particular, memory conflict conditions which arise from an attempt to fetch an instruction and data from the same memory block in a single clock cycle are detected. When a conflict is detected, the instruction giving rise to the conflict is stored in the instruction cache. On subsequent instances of the same instruction during program execution, the instruction is fetched from the instruction cache. By selectively caching only those instructions which produce a conflict, a small instruction cache can be used.

In the above-described example of a digital signal processor which uses a three stage pipeline, the instruction that causes a memory conflict is fetched two clock cycles prior to the memory conflict condition. On the first instance of the memory conflict, a delay of one cycle is caused by the conflict. The instruction being fetched at the time when the conflict was detected is loaded from memory into the instruction cache on the clock cycle following detection of the conflict. On subsequent instances of a memory conflict for the same instruction, the instruction is fetched from the instruction cache and an operand is fetched from a block of memory, all in a single clock cycle. Thus, except for the first instance of an instruction that produces a memory conflict, delay caused by the memory conflict is eliminated. It will be understood that a pipeline architecture is not required for practice of the present invention.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A digital signal processor comprising:
   a computation unit for performing digital signal computations;
   a memory including a plurality of memory blocks for storing instructions and data for the digital signal computations;
   a first bus and a second bus interconnecting said computation unit and said memory;
   a data address generator for addressing data in said memory;
   an instruction cache for storing selected instructions; and
   a control circuit for controlling transfer of instructions to and between said memory, said instruction cache and said computation unit, said control circuit including:
      means for detecting a memory conflict condition when an instruction address on said first bus and a data address on said second bus both reference locations in one of said memory blocks in a single clock cycle; and means responsive to said memory conflict condition for fetching an instruction corresponding to said instruction address from said instruction cache when said instruction is stored in said instruction cache and for fetching said instruction from said memory and loading said instruction into said instruction cache when said instruction is not stored in said instruction cache.

2. A digital signal processor as defined in claim 1 wherein said means for detecting a memory conflict condition comprises means for comparing said instruction address with said data address, said memory conflict condition being indicated when said instruction address and said data address represent locations in said one of said memory blocks.

3. A digital signal processor as defined in claim 1 further including an instruction register responsive to said control circuit for receiving said instruction from said instruction cache when said instruction is stored in said instruction cache and for receiving said instruction from said one of said memory blocks when said instruction is not stored in said instruction cache.

4. A digital signal processor as defined in claim 1 wherein said means for detecting a memory conflict condition includes means for detecting an external memory conflict condition when said instruction address and said data address both reference locations in an external memory in said single clock cycle.

5. A digital signal processor as defined in claim 1 wherein said control circuit further includes means responsive to a bus conflict condition for fetching an instruction corresponding to said instruction address from said instruction cache when said instruction is stored in said instruction cache and for fetching said instruction from said memory and loading said instruction into said instruction cache when said instruction is not stored in said instruction cache.

6. A digital signal processor comprising:
   a computation unit for performing digital signal computations;
   an internal memory for storing instructions and data for the digital signal computations;
   a first bus and a second bus interconnecting said computation unit and said internal memory;
   an external bus selectively connected to said first bus or to said second bus for accessing an external memory;
   a data address generator for addressing data in said internal memory and in said external memory;
   an instruction cache for storing selected instructions; and
   a control circuit for controlling transfer of instructions to and between said internal memory, said external memory, said instruction cache and said computation unit, said control circuit including:
      means for detecting an external memory conflict condition when an instruction address on said first bus and a data address on said second bus both reference locations in said external memory in a single clock cycle; and
      means responsive to said external memory conflict condition for fetching an instruction corresponding to said instruction address in said instruction cache when said instruction is stored in said instruction cache and for fetching said instruction from said external memory and loading said instruction into said instruction cache when said instruction is not stored in said instruction cache.

7. A digital signal processor as defined in claim 6 wherein said means for detecting an external memory conflict condition comprises means for detecting that said data address and said instruction address each represent a location in said external memory.

8. In a digital signal processor comprising a computation unit for performing digital signal computations, a memory including a plurality of memory blocks for storing instructions and data for the digital signal computations, a first bus and a second bus interconnecting said computation unit and said memory, an instruction cache for storing selected instructions, and a control circuit for controlling transfer of instructions to and between said memory, said instruction cache and said computation unit, the improvement wherein said control circuit includes:
   means for detecting a memory conflict condition when an instruction address on said first bus and a data address on said second bus both reference locations in one of said memory blocks in a single clock cycle; and
   means responsive to said memory conflict condition for fetching an instruction corresponding to said instruction address from said instruction cache when said instruction is stored in said instruction cache and for fetching said instruction from said memory and loading said instruction into said instruction cache when said instruction is not stored in said instruction cache.

9. An improved digital signal processor as defined in claim 8 wherein said means for detecting a memory conflict condition comprises means for comparing said instruction address with said data address, said memory conflict condition being indicated when said instruction address and said data address reference locations in said one of said memory blocks.

10. An improved digital signal processor as defined in claim 8 wherein said means for detecting a memory conflict condition includes means for detecting an external memory conflict condition when said instruction address and said data address both reference locations in an external memory in said single clock cycle.

11. In a digital signal processor comprising a computation unit for performing digital signal computations, a memory including a plurality of memory blocks for storing instructions and data for the digital signal computations, a first bus and a second bus interconnecting said computation unit and said memory, a data address generator for addressing data in said memory, and an instruction cache for storing selected instructions, a method for controlling transfer of instructions to and between said memory, said instruction cache and said computation unit, comprising the steps of:
   detecting a memory conflict condition when an instruction address on said first bus and a data address on said second bus both reference locations in one of said memory blocks in a single clock cycle; and
   responding to said memory conflict condition by fetching an instruction corresponding to said instruction address from said instruction cache when said instruction is stored in said instruction cache and by fetching said instruction from said memory and loading said instruction into said instruction cache when said instruction is not stored in said instruction cache.

12. A method as defined in claim 11 wherein the step of detecting a memory conflict condition includes comparing said instruction address with said data address, said memory conflict condition being indicated when said instruction address and said data address represent locations in said one of said memory blocks.

13. A method as defined in claim 11 wherein the step of detecting a memory conflict condition includes detecting an external memory conflict condition when said instruction address and said data address both reference locations in an external memory in said single clock cycle.

14. A digital signal processor comprising:

a computation unit for performing digital signal computations;

a memory including a plurality of memory blocks for storing instructions and data for the digital signal computations;

a first bus and a second bus interconnecting said computation unit and said memory;

an instruction cache for storing selected instructions; and a control circuit for controlling transfer of instructions to and between said memory, said instruction cache and said computation unit, said control circuit including:

a circuit for generating a memory conflict signal when an instruction address on said first bus and a data address on said second bus conflict for access to one of said memory blocks in a single clock cycle;

a circuit responsive to said memory conflict signal for fetching an instruction corresponding to said instruction address from said instruction cache when said instruction is stored in said instruction cache; and a circuit responsive to said memory conflict signal for fetching said instruction from said one of said memory blocks and for loading said instruction into said instruction cache when said instruction is not stored in said instruction cache.

15. A digital signal processor as defined in claim 14 wherein said circuit for generating a memory conflict signal comprises a comparator for comparing said instruction address with said data address, said memory conflict signal being generated when said instruction address and said data address represent locations in said one of said memory blocks.

16. A digital signal processor as defined in claim 14 further including an instruction register responsive to said control circuit for receiving said instruction from said instruction cache when said instruction is stored in said instruction cache and for receiving said instruction from said one of said memory blocks when said instruction is not stored in said instruction cache.

17. A digital signal processor as defined in claim 14 wherein said circuit for generating a memory conflict signal includes a circuit for generating an external conflict signal when said instruction address and said data address both reference locations in an external memory in said single clock cycle.

\* \* \* \* \*